United States Patent

[11] 3,579,979

| [72] | Inventors | Paul Bosch<br>Ludwigsburg;<br>Walter Kobald, Stuttgart-Feuerbach, both of, Germany |
|---|---|---|
| [21] | Appl. No. | 830,324 |
| [22] | Filed | June 4, 1969 |
| [45] | Patented | May 25, 1971 |
| [73] | Assignee | Robert Bosch GmbH<br>Stuttgart, Germany |
| [32] | Priority | June 5, 1968 |
| [33] | | Germany |
| [31] | | P 17 51 471.5 |

[54] REGULATED HYDRAULIC DRIVE CONTROL APPARATUS
12 Claims, 3 Drawing Figs.

[52] U.S. Cl. .................................................. 60/19, 60/53
[51] Int. Cl. ..................................................... F15b 15/18
[50] Field of Search ........................................... 60/53, 19, 52 (SR), (E)

[56] References Cited
UNITED STATES PATENTS

| 1,981,805 | 11/1934 | Kacer et al. ................... | 60/19UX |
| 2,516,662 | 7/1950 | Vickers et al. ................ | 60/53X |
| 2,774,436 | 12/1956 | Ferris ............................ | 60/19X |
| 3,003,309 | 10/1961 | Bowers et al. ................ | 60/53X |
| 3,371,479 | 3/1968 | Yapp et al. ................... | 60/19X |

*Primary Examiner*—Edgar W. Geoghegan
*Attorney*—Michael S. Striker

ABSTRACT: A hydraulic drive includes a prime mover and a hydraulic pump-motor transmission which are respectively adjusted to correlated desirable operational conditions by three three-dimensional cam surfaces of a control cam. A speed regulator means compares a desired output speed with the actual output speed of the prime mover and preferably also of the hydraulic motor, and adjusts the drive accordingly.

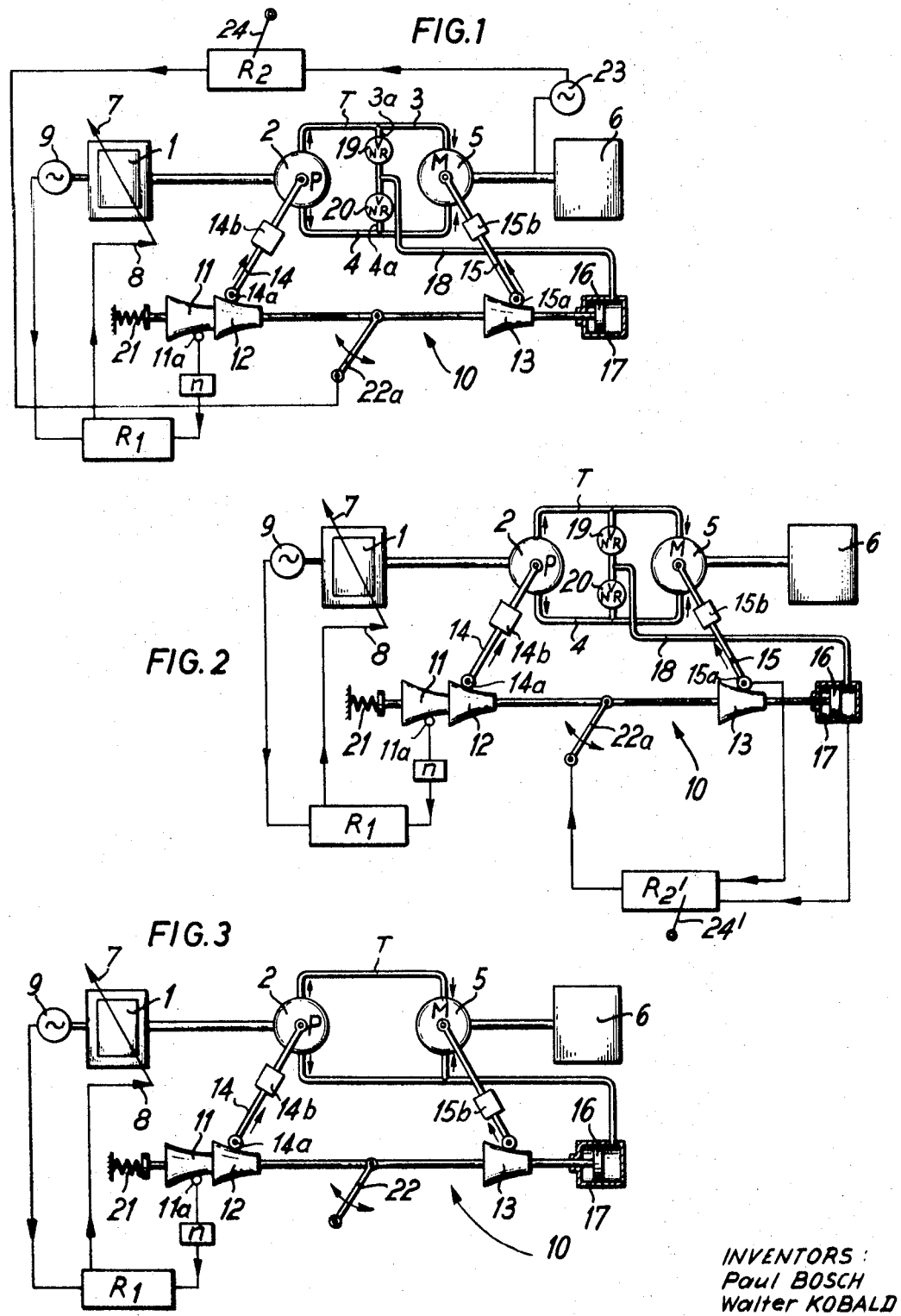

REGULATED HYDRAULIC DRIVE CONTROL APPARATUS

BACKGROUND OF THE INVENTION

The present invention relates to a drive comprising a combustion engine driving a hydrostatic pump-motor transmission. The fuel supply of the combustion engine, the discharge volume of the pump, and the suction volume of the hydraulic motor are simultaneously adjusted by control means, preferably by three cam followers under the control of three three-dimensional cam faces of a control cam which is manually turned, and axially shifted distances depending on the hydraulic pressure in the hydrostatic transmission so that maximum efficiency and performance are obtained.

REFERENCE TO A RELATED APPLICATION

A drive as described above is disclosed in the copending application Ser. No. 822,381 filed by D. Stams on May 7, 1969, entitled "Hydraulic Drive Control Arrangement," which is assigned to the same assignee as the present application.

SUMMARY OF THE INVENTION

It is one object of the invention to overcome disadvantages of the apparatus disclosed in the above copending application, and to provide a regulated drive control apparatus which obtains a stable regulation of the drive in the entire torque range of the combustion engine which acts as a prime mover, particularly when the power, torque and force of the output of the hydraulic motor is to be regulated.

In accordance with the invention, a speed regulator is provided which receives information regarding a desired speed from the control means, and also information representing the actual speed, and adjusts the respective part of the drive until the same operates at the desired speed which becomes the actual speed.

In all embodiments of the invention, a speed regulator is provided which operates as explained above to effect adjustment of the output speed of the prime mover. In another embodiment of the invention, a second speed regulator is also provided for adjusting also the output speed of the motor until its actual output speed is the same as the desired output speed which is manually introduced into the second speed regulator.

In a third embodiment, a torque regulator receives information regarding the fluid pressure in the hydraulic transmission, the operational condition of the regulator of the hydraulic motor, and information regarding a desired torque by operation of manual means, controlling the control means, preferably control cam means, accordingly.

A regulated hydraulic drive control apparatus according to the invention comprises drive means including a prime mover having first regulating means, and a hydrostatic transmission having second regulating means and including a pump driven by the prime mover and a hydraulic motor hydraulically connected with the pump, the second regulating means preferably including pump regulating means and motor regulating means; and a control device including control means, preferably cam means, representing desired values and connected with the second regulating means for adjusting the same to obtain adjustment of the hydrostatic transmission, speed measuring means driven by the prime mover, a speed regulator having first input means connected with the speed measuring means for receiving information representing the actual speed of the prime mover, second input means connected with the control means for receiving information representing a desired speed of the prime mover correlated with the adjustment of the hydraulic transmission, and output means connected with the first regulating means for adjusting the same until the prime mover operates at the desired speed, and operating means for operating the control means in accordance with operational conditions whereby the first and second regulating means are operated to effect correlated adjustment of the prime mover and of the hydraulic transmission for obtaining optimal efficiency and performance of the drive means at different operational conditions.

In one embodiment of the invention, the operating means have manual means directly connected with the control means for operating the same, and more particularly directly connected with turnable control cam means which are turned by the manual means.

In another embodiment of the invention, the operating means include second speed measuring means driven by the hydraulic motor to represent the actual output speed of the same. A second speed regulator is connected with the speed measuring means for receiving information regarding the actual output speed of the hydraulic motor, and to manual second input means representing the desired output speed of the hydraulic motor, and the output means of the speed regulator are connected with the control means, more particularly with the cam means, for operating the same until the actual output speed of the hydraulic motor is equal to the desired speed.

In a third embodiment of the invention, the operating means include pressure responsive means hydraulically connected with the hydrostatic transmission and operatively connected with the control means, more particularly with cam means, for adjusting the same in accordance with the fluid pressure in the transmission. A torque regulator is connected with the second regulating means, more particularly with the motor regulating means, and also with the pressure responsive means, and with manual input means by which information regarding a desired output torque is introduced. The output means of the torque regulator are connected with the control means, and more particularly with the cam means for turning the same. In this embodiment, a constant output torque of the hydraulic motor, and a corresponding constant force of the same is obtained.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 1 is a schematic and diagrammatic view illustrating one embodiment of the invention in which the output speed of the prime mover and the output speed of the hydraulic motor are independently adjusted to desired manually introduced speed values;

FIG. 2 is a schematic and diagrammatic view illustrating another embodiment of the invention in which the output speed of the prime mover is adjusted by a speed regulator, while the torque of the hydraulic motor is adjusted by a torque regulator; and FIG. 3 is a schematic and diagrammatic view illustrating a further embodiment of the invention in which the output speed of the prime mover is adjusted to a desired value by a speed regulator.

DESCRIPTION OF THE PREFERRED EMBODIMENTS

Referring first to the embodiment of FIG. 3, a prime mover 1, for example a combustion engine, is coupled with a hydrostatic transmission T which includes a pump 2 hydraulically connected with a hydraulic motor 5 and driving the same. Motor 5 drives a car or other machine 6. Pump 2 has a regulating means 14 by which the pump volume and the direction in which the liquid is pumped are determined. Motor 5 has a regulating means 15 by which the suction volume of motor 5 is adjusted. Combustion engine 1 has a regulating means 8 by which the fuel injection means 7 or the carburetor is adjusted to obtain different speeds of prime mover 1.

Control means 10 include a control cam means which has three cams 11, 12 and 13, each of which has a three-dimensional cam surface. Cam means 11, 12, 13 is mounted for axial movement and for angular turning movement, and is biased by spring 21 to move to the right, and is operable by a manual means 22 to turn about its axis. A cylinder 17 is connected with the hydrostatic transmission T to receive pressure fluid from the same, and a piston 16 mounted with some circumferential play in cylinder 17 is directly connected with cam 13 of the cam means 11, 12, 13 so that the cam means is axially displaced against the action of a spring 21 in accordance with the pressure in the hydrostatic transmission T. Cam means 11, 12, 13 can also be turned about its axis by a manual means 22 so that cam follower means 11a, 14a, and 15a respond to both axial and circumferential adjustments of the respective cams which have high and low portions in circumferential direction as well as in axial direction. Cam follower means 14a and 15a are connected with the pump regulating means 14 and the motor regulating means 15, respectively, so that pump 2 and hydraulic motor 5 are adjusted in accordance with the axial and circumferential displacement of cams 12 and 13. Cam follower means 11a is connected by a power booster $n$ with one input of a speed regulator $R_1$ whose other input is connected to a speed measuring means, preferably a tachogenerator 9 which is driven by the prime mover 1 and rotates at the output speed of the same. The actual output speed of prime mover 1 is compared in the speed regulator $R_1$ with the desired output speed of prime mover 1 as represented by the cam surface of cam 11. The differential signal is transmitted from the output of the speed regulator $R_1$ to the regulating means 8 which adjusts the injection pump or carburetor 7 of the combustion engine of prime mover 1 accordingly. Adjustment of the regulating means of combustion engine 1 takes place until the actual speed of the output shaft of the same is identical with the desired speed represented by the portion of cam 11 sensed by cam follower 11a. It will be understood that the sensed portion of cam 11 is determined by the axial displacement of cam 11 by piston 16 in accordance with the fluid pressure in the hydrostatic transmission T, and also by turning cam 11, together with cams 12 and 13, by the manual means 22 whose position is selected in accordance with the desired operational conditions. For example, when a different output speed of prime mover 1 is desired, the handle or other manual means 22 is turned to a position representing the desired speed, which due to the action of the speed regulator $R_1$ will soon become the actual speed of the prime mover 1. The desired speed according to which cam 11 is finally placed, depends also on the fluid pressure in transmission T. In addition to power booster $n$, power boosters or servomotors 14b and 15b are provided for connecting cam followers 14a and 15a with the pump regulating means and motor regulating means 14 and 15.

The apparatus shown in FIG. 3 regulates the drive to obtain maximum efficiency and power, and therefore only one speed regulator $R_1$ is required. By operation of manual lever 22, the combustion engine 1 and the hydrostatic transmission T are set to the desired output power. It has been found that when the regulating means 7 of the combustion engine 1 is directly connected to the cam follower 11a of cam 11, the drive operates instable in certain ranges of numbers of revolutions. By indirect adjustment by means of speed regulator $R_1$, stable operation within the entire speed range is obtained.

In the embodiment of FIG. 3, cam means 11, 12 and 13 are turned by a direct manual operation on manual lever 22. The stability of the apparatus is further improved by only indirectly operating cam means 11, 12 and 13 by a manual operation, as will be explained with reference to FIGS. 1 and 2.

Referring now to FIG. 1, the drive means include again a prime mover 1, and a hydraulic transmission T including a pump 2 and a hydraulic motor 5 connected by conduits 3 and 4. Conduits 3a and 4a are connected to conduits 3 and 4 and to each other and respectively include check valves 19 and 20. Conduit 18 is connected to conduits 3a and 4a intermediate the check valves 19 and 20 and communicates at its other end with cylinder 17. By this arrangement, the highest fluid pressure at the output of pump 2 is supplied to cylinder 17, independent of the direction of rotation of pump 2, and direction in which the fluid is circulated in the transmission for the purpose of reversing motor 5. When spring 21 displaces piston 17 to the right as viewed in the drawing, pressure fluid flows through the gap around piston 17 from the right chamber to the left chamber in cylinder 16. Cam follower means 14a and 15a control the pump regulating means 14 and the motor regulating means 15 so that pump 2 is adjusted to a desired pumped volume and to the selected direction of rotation of motor 5, while motor regulating means 15 is adjusted to vary the suction volume of motor 5. The cam surfaces of cams 12 and 13 are designed to obtain optimal efficiency and performance of the transmission T.

As in the embodiment of FIG. 3, the injection pump or carburetor 7 of the combustion engine 1 is adjusted by regulating means 8 controlled by a speed regulator $R_1$ which receives information regarding a desired output speed of combustion engines 1 from the cam follower 11a, and information representing the actual speed from tachogenerator 9.

In the embodiment of FIG. 1, the operating means by which cam means 11, 12, 13 is adjusted, include in addition to a lever 22a, which is not directly manually operated as in the embodiment of FIG. 3, a speed regulator $R_2$ which has an input connected to a speed responsive tachogenerator 23 which is driven from the output shaft of motor 5 and supplies information representing the actual output speed of motor 5 to the speed regulator $R_2$. Additional information is introduced into speed regulator $R_2$ by a manual means 24 which is set by the operator to a position representing a desired speed of the output of motor 5. The output of speed regulator $R_2$ is connected to lever 22a and operates the same for turning cam means 11, 12, 13. The desired output speed of motor 5 is set by manual means 24, the tachogenerator 23 supplies the actual speed of motor 5 which is compared with the desired speed in speed regulator $R_2$ so that cam means 11, 12, 13 is turned to a position in which the actual speed is equal to the desired and manually set speed.

Between the speed regulators $R_1$ and $R_2$ exists an effective interconnection in the form of the selected value of the rotary speed of the combustion engine 1 set by the manual lever 24. Cams 11, 12 and 13 are designed to obtain optimal efficiency of the drive means which include combustion engine 1, pump 2, and motor 5.

The above-described embodiment of FIG. 1 regulates the rotary speed of the drive means. When manual means 24 of speed regulator $R_2$ is placed in a selected position for obtaining a desired output speed of motor 5, a certain rotary speed of the output shaft of combustion engine 1 is required. This speed is determined under control of cam follower 11a and speed measuring means 9 by speed regulator $R_1$. At the same time, the speed regulator $R_2$ receives information regarding the actual output speed of motor 5 from speed measuring means 23, independently of the selected position of manual means 24. The desired output shaft speed is compared with the actual output shaft speed, and according to the differential between the speeds, speed regulator $R_2$ sets lever 22a to a position determining the required angular position of cam means 11, 12, 13 at which the actual output speed of motor 5 is the same as the selected desired output speed. The output speed of motor 5 and of the entire drive, is mainly determined by the setting of the manual lever 24, and lever 22a is not manually operated, but indirectly controlled by the speed regulator $R_2$.

The embodiment of FIG. 2 regulates a drive including combustion engine 1, pump 2, and motor 5 as described with reference to FIG. 3, and has a speed regulator $R_1$ for adjusting the output speed of combustion engine 1, as described with reference to FIG. 3. The operating means of cam means 11, 12 and 13 include, in addition to the pressure responsive piston 16, and the lever 22a, also a torque regulator $R_2'$ whose output is connected to lever 22a for turning cam means 11, 12 and 13. The pulling force of a car driven by the drive is to be regulated, which corresponds to a regulation of hydraulic motor 5 to a constant torque. Since the torque depends on the hydraulic pressure in the hydrostatic transmission T and on the suction volume of the hydraulic motor 5, and is the product of the multiplication of these two factors, the torque regulator $R_2'$ is connected with cylinder 17 to receive information representing the fluid pressure in the hydrostatic transmission T, and is connected with the cam follower 15a, or with the regulating means 15, whose position represents the adjusted suction volume of the hydraulic motor 5. The desired torque is introduced into the torque regulator by manually setting lever 24' to a selected position. If the pulling force of the car driven by the drive shown in FIG. 2 is not the same as set by placing manual lever 24' in the respective position, cam means 11, 12, 13 are turned by lever 22a until the actual pulling force of the car, and the output torque of motor 5 are the same as the desired values set by operation of manual lever 24'.

Since cam means 11, 12, and 13 are turned, the rotary speed of the combustion engine 1 is also adjusted by speed regulator $R_1$ to the desired speed. When the actual speed or prime mover 1 is equal to the desired speed represented by the position of cam 11, the desired constant pulling force, selected by manual adjustment of the torque regulator $R_2'$, is actually obtained. The regulators $R_1$ and $R_2'$ cooperate and interact with each other, similar to the interaction of speed regulators $R_1$ and $R_2$ in the embodiment of FIG. 2.

As compared with the embodiment of FIG. 3, the lever 22a of the embodiments of FIGS. 1 and 2 is not manually adjusted, but indirectly set.

The regulators $R_1$, $R_2$, $R_2'$ are electronic devices of well-known construction, and the electric signals produced at the outputs of the regulators are advantageously amplified by electronic amplifiers, not shown, to provide the force required for the adjustment of the respective adjusted means, namely regulating means 8 of the combustion engine 1, and lever 22a of the cam means 11, 12, 13.

If combustion engine 1 is a Diesel motor, an injection pump 7 is adjusted by the regulator $R_1$. If prime mover 1 is an Otto motor, the throttle is adjusted by regulating means 8.

As noted above, in all embodiments of the invention, cams 11, 12 and 13 turn together, and are axially shifted together, and have circumferential and axially extending cam tracks so that the cam surface of each of the cams is three-dimensional. The cam means 11, 12, 13 and cam follower means 11a, 14a, 15a constitute control means for directly or indirectly controlling the prime mover 1 and the hydraulic transmission T.

It will be understood that each of the elements described above, or two or more together, may also find a useful application in other types of regulating apparatus for hydraulic drives differing from the types described above.

While the invention has been illustrated and described as embodied in a regulated drive control apparatus including speed regulators for comparing actual output speeds with desired manually selected output speeds, it is not intended to be limited to the details shown, since various modifications and structural changes may be made without departing in any way from the spirit of the present invention.

What is claimed as new and desired to be protected by Letters Patent is set forth in the appended claims.

We claim:

1. Regulated hydraulic drive control apparatus, comprising, in combination, drive means including a prime mover having first regulating means, and a hydrostatic transmission having second regulating means and including a pump driven by said prime mover and a hydraulic motor hydraulically connected with said pump; and a control device including control means representing desired values and connected with said second regulating means for adjusting the same to obtain adjustment of said hydrostatic transmission, speed measuring means driven by said prime mover, a speed regulator having first input means connected with said speed measuring means for receiving information representing the actual speed of said prime mover, second input means connected with said control means for receiving information representing a desired speed of said prime mover correlated with said adjustment of said hydrostatic transmission, and output means connected with said first regulating means for adjusting the same until said prime mover operates at said desired speed, and operating means for operating said control means in accordance with operational conditions whereby said first and second regulating means are operated to effect correlated adjustments of said prime mover and of said hydrostatic transmission for obtaining optimal efficiency and performance of said drive means at different operational conditions.

2. An apparatus as claimed in claim 1 wherein said second regulating means includes a pump regulating means and a motor regulating means for said pump and said motor, respectively; wherein said control means are connected with said motor regulating means and said pump regulating means for adjusting the same simultaneously to effect correlated adjustments of said pump and said motor.

3. An apparatus as claimed in claim 2 wherein said control means include cam means having three three-dimensional cam surfaces, and first, second, and third cam follower means cooperating with said cam surfaces, respectively, and respectively connected with said first regulating means, said pump regulating means, and said motor regulating means, and pressure responsive means hydraulically connected with said transmission and operatively connected with said cam means for displaying the same in one direction in accordance with the fluid pressure in said transmission; and wherein said operating means are connected with said cam means for moving the same in a direction transverse to said one direction.

4. An apparatus as claimed in claim 3 wherein said cam means has three cam portions connected for rotation about an axis, and respectively having said three-dimensional cam surfaces; wherein said operating means turn said cam means about said axis, and said pressure responsive means displace said cam means in one axial direction, said control means including spring means biasing said cam means in the opposite axial direction.

5. An apparatus as claimed in claim 4 wherein said operating means include manual means directly connected with said cam means for turning the same in accordance with operational conditions.

6. An apparatus as claimed in claim 1 wherein said operating means include manual means directly connected with said control means for operating the same in accordance with operational conditions.

7. An apparatus as claimed in claim 1 wherein said operating means include second speed measuring means driven by said hydraulic motor to represent the actual output speed of the same; a second speed regulator having first input means connected with said speed measuring means for receiving information representing the actual output speed of said hydraulic motor, manual second input means for representing the desired output speed of said hydraulic motor, and output means connected with said control means for operating the same until the actual output speed of said hydraulic motor is equal to the desired speed selected in accordance with operational conditions by operation of said manual second input means.

8. An apparatus as claimed in claim 7 wherein said control means include cam means having three three-dimensional cam surfaces, and first, second, and third cam follower means cooperating with said cam surfaces, respectively, and respectively connected with said first regulating means, said pump regulating means and said motor regulating means, and pressure responsive means hydraulically connected with said transmission and operatively connected with said cam means for displacing the same in one direction in accordance with the fluid pressure in said transmission; and wherein said operating means are connected with said cam means for moving the same in a direction transverse to said one direction.

9. An apparatus as claimed in claim 1 wherein said operating means comprise pressure responsive means hydraulically connected with said transmission and operatively connected with said control means for adjusting the same in accordance with the fluid pressure in said transmission, a torque regulator having first input means connected with said second regulating means, second input means connected with said pressure responsive means, third manual input means for representing information regarding a desired output torque of said hydraulic motor, and output means connected with said control means for operating the same whereby to maintain the output torque of said motor constant.

10. An apparatus as claimed in claim 9 wherein said second regulating means include a pump regulating means and a motor regulating means respectively controlled by said control means, said motor regulating means adjusting the suction volume of said hydraulic motor and being operatively connected with said second input means of said second speed regulator.

11. An apparatus as claimed in claim 10 wherein said control means include cam means having three three-dimensional cam surfaces, and first, second, and third cam follower means cooperating with said cam surfaces, respectively, and respectively connected with said first regulating means, said pump regulating means, and said motor regulating means; wherein said pressure responsive means is operatively connected with said cam means for displacing the same in one direction in accordance with the fluid pressure in said transmission; wherein said third cam follower means which is connected with motor regulating means is also connected with said first input means of said second regulator means; and wherein said pressure responsive means is operatively connected with said cam means for displacing the same in a direction transverse to said one direction.

12. An apparatus as claimed in claim 1 wherein said speed responsive means is a tachogenerator generating speed-representing electric signals; and wherein said speed regulator is an electronic device receiving said electric signals.